(12) United States Patent
Shimo et al.

(10) Patent No.: US 8,683,780 B2
(45) Date of Patent: Apr. 1, 2014

(54) GAS TURBINE ENGINE AND PULSE DETONATION COMBUSTION SYSTEM

(76) Inventors: Masayoshi Shimo, Carmel, IN (US); Philip H. Snyder, Avon, IN (US)

( * ) Notice: Subject to any disclaimer, the term of this patent is extended or adjusted under 35 U.S.C. 154(b) by 0 days.

(21) Appl. No.: 13/337,104

(22) Filed: Dec. 24, 2011

(65) Prior Publication Data

US 2012/0324860 A1 Dec. 27, 2012

Related U.S. Application Data

(60) Provisional application No. 61/427,731, filed on Dec. 28, 2010.

(51) Int. Cl.
*F02K 7/00* (2006.01)
*F02C 5/00* (2006.01)
*F23C 15/00* (2006.01)

(52) U.S. Cl.
USPC ............ 60/247; 60/39.76; 60/39.38; 431/1

(58) Field of Classification Search
USPC ................ 60/247, 39.38, 39.76; 431/1
See application file for complete search history.

(56) References Cited

U.S. PATENT DOCUMENTS

| | | | |
|---|---|---|---|
| 3,910,494 A | 10/1975 | Melton, Jr. | |
| 2006/0112672 A1 | 6/2006 | Razzell et al. | |
| 2006/0254254 A1 | 11/2006 | Saddoughi et al. | |
| 2007/0137172 A1* | 6/2007 | Rasheed et al. | 60/39.76 |
| 2007/0144179 A1 | 6/2007 | Pinard et al. | |
| 2007/0157623 A1 | 7/2007 | Dean et al. | |
| 2007/0180810 A1* | 8/2007 | Chapin et al. | 60/39.76 |
| 2007/0180811 A1 | 8/2007 | Rasheed et al. | |
| 2007/0180815 A1 | 8/2007 | Tangirala et al. | |
| 2007/0245712 A1 | 10/2007 | Shimo et al. | |
| 2009/0133377 A1* | 5/2009 | Kenyon et al. | 60/39.76 |
| 2010/0186370 A1* | 7/2010 | Daniau et al. | 60/247 |
| 2012/0047873 A1* | 3/2012 | Gutmark et al. | 60/247 |

FOREIGN PATENT DOCUMENTS

WO WO 2007/112442 A2 10/2007

OTHER PUBLICATIONS

International Search Report and Written Opinion, PCT/US2011/067406, Rolls-Royce Corporation, Apr. 24, 2012.
Kailasanath, K., Recent Developments in the Research on Pulse Detonation Engines, AIAA Journal, vol. 41, No. 2, Feb. 2003.
Shimo, M., et al., Multicyclic Detonation Initiation Studies in Valveless Pulsed Detonation Combustors, Journal of Propulsion and Power, vol. 24, No. 2, Mar.-Apr. 2008.

(Continued)

*Primary Examiner* — Phutthiwat Wongwian
*Assistant Examiner* — Scott Walthour
(74) *Attorney, Agent, or Firm* — Krieg DeVault LLP

(57) ABSTRACT

One embodiment of the present invention is a unique pulse detonation combustion system. Another embodiment is a unique gas turbine engine including a unique pulse detonation combustion system. In some embodiments, the pulse detonation combustion system includes an inlet section, a vortex generator and at least one flame accelerator. The inlet section, vortex generator and the at least one flame accelerator may be operative to initiate a deflagration to detonation transition. In some embodiments, the pulse detonation combustion system may include a flame accelerator configured with a directionally-dependent drag coefficient. Other embodiments include apparatuses, systems, devices, hardware, methods, and combinations for pulse detonation combustion systems, gas turbine engines, and other machines and engines. Further embodiments, forms, features, aspects, benefits, and advantages of the present application shall become apparent from the description and figures provided herewith.

20 Claims, 5 Drawing Sheets

(56) References Cited

OTHER PUBLICATIONS

Wintenberger, J.M., et al., An Analystical Model for the Impulse of Single-Cycle Pulse Detonation Tube, Journal of Propulsion and Power, vol. 19, No. 1, Jan.-Feb. 2003.

Brophy, C.M., et al., Fuel Distribution Effects on Pulse Detonation Engine Operation and Performance, Journal of Propulsion and Power, vol. 22, No. 6, Nov.-Dec. 2006.

Frolov, S.M., et al., Detonation Initiation by Controlled Triggering of Electric Discharges, Journal of Propulsion and Power, vol. 19, No. 4, Jul.-Aug. 2003.

* cited by examiner

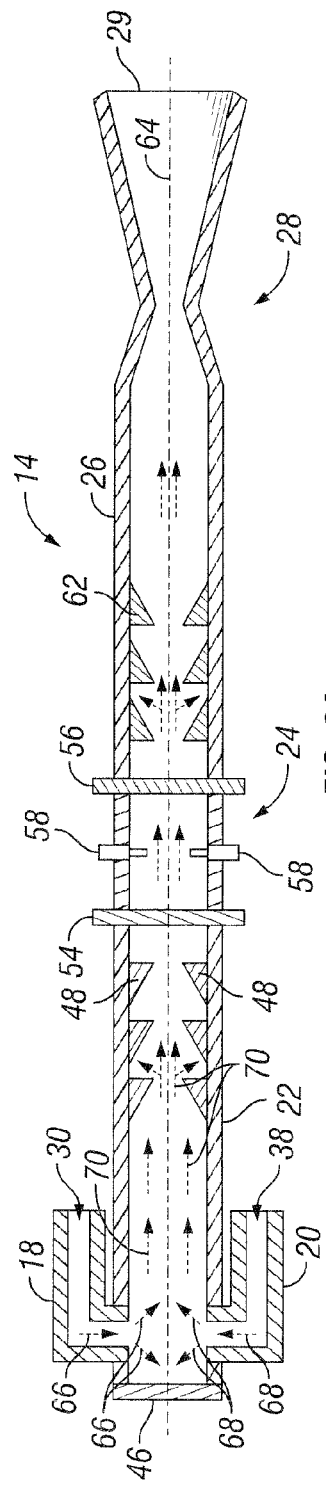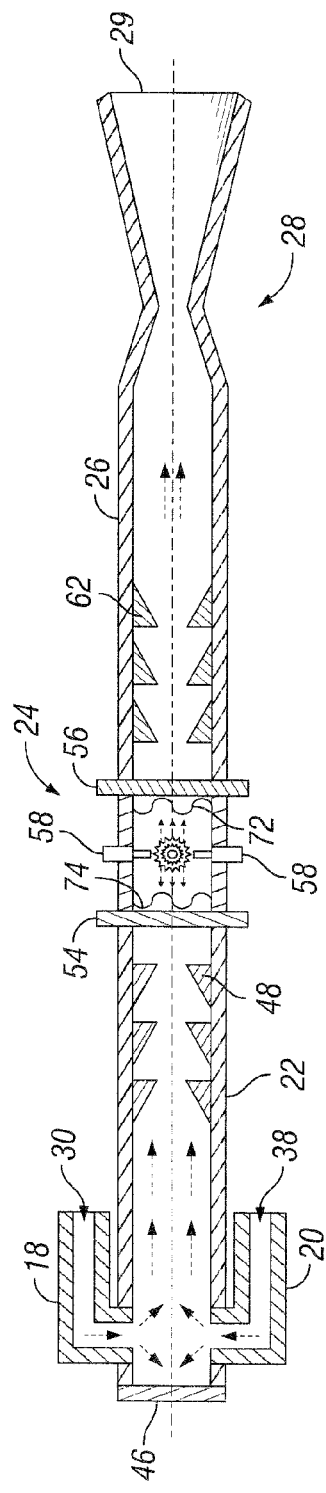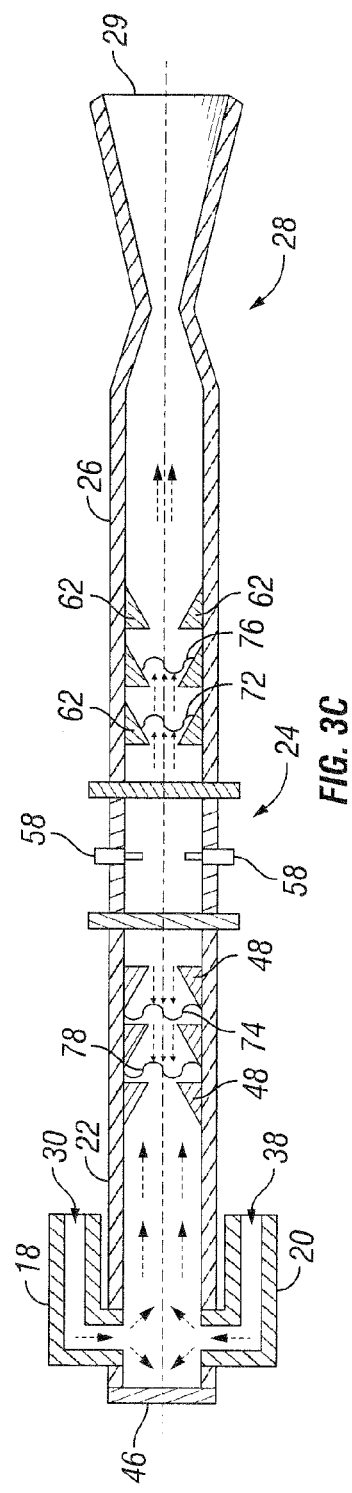

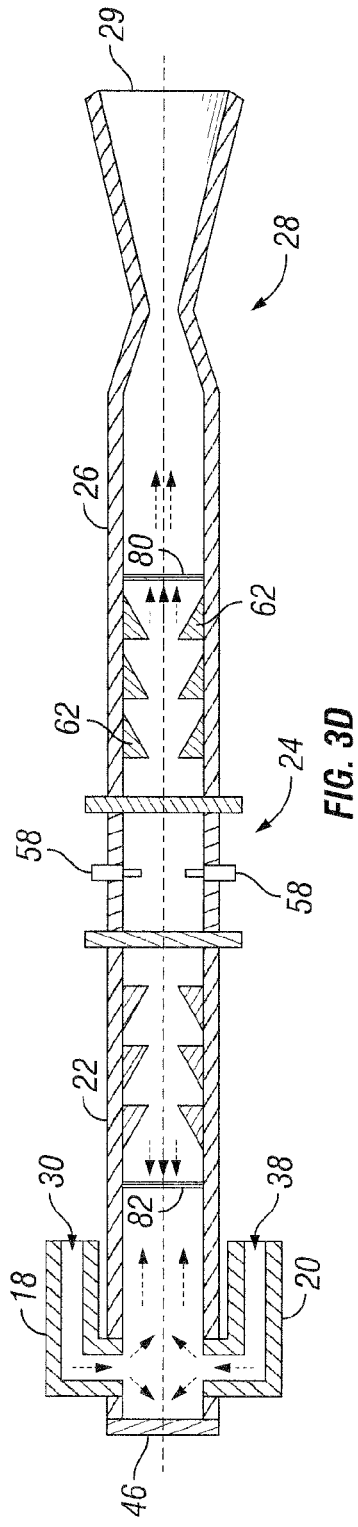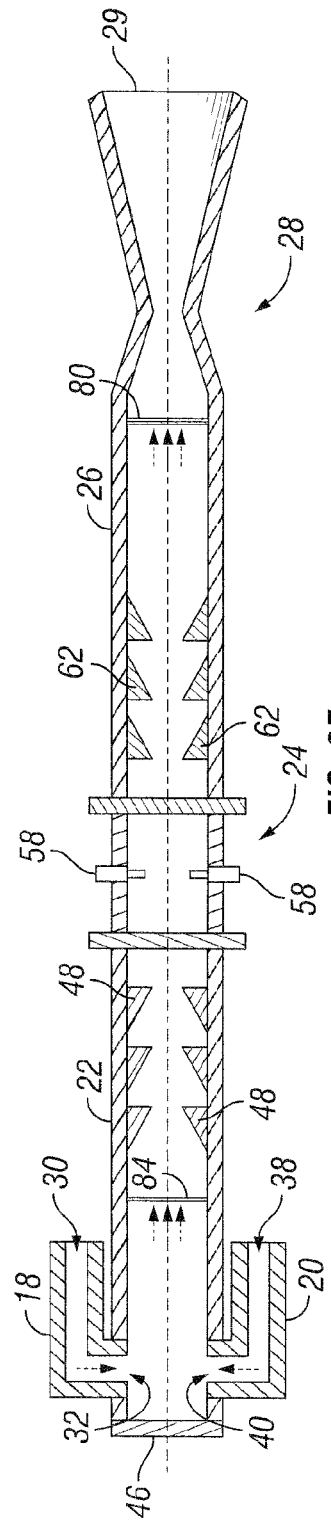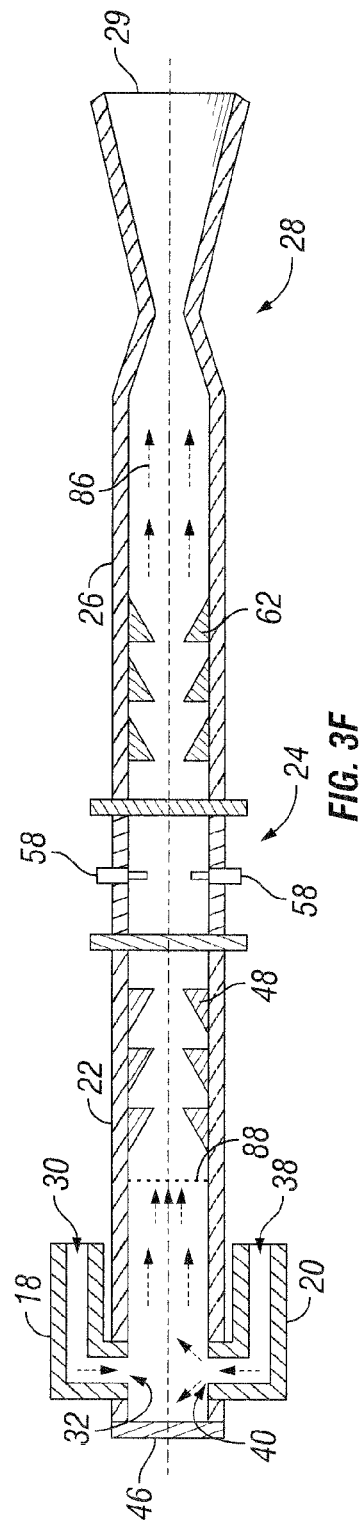

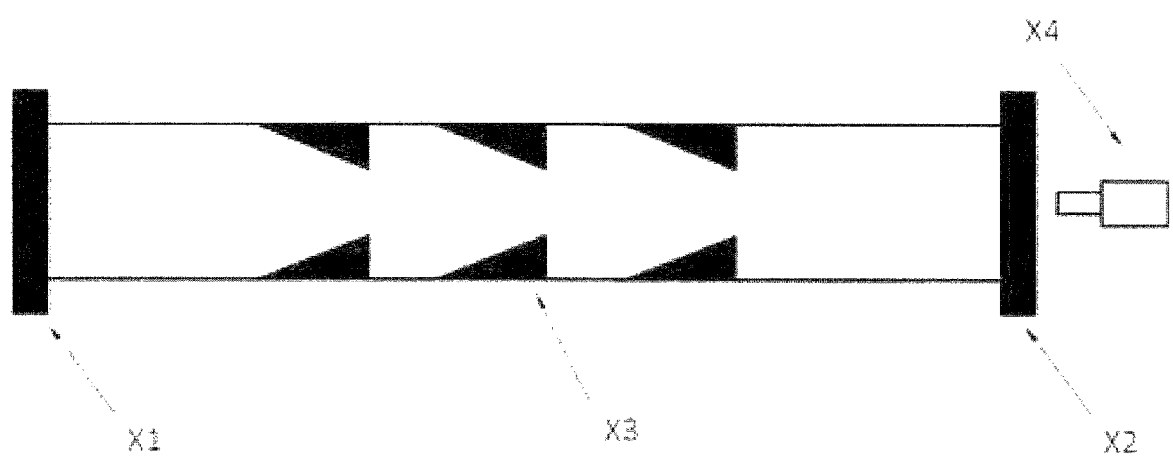
FIG. 3D1

GAS TURBINE ENGINE AND PULSE DETONATION COMBUSTION SYSTEM

CROSS REFERENCE TO RELATED APPLICATIONS

The present application claims benefit of U.S. Provisional Patent Application No. 61/427,731, filed Dec. 28, 2010, entitled GAS TURBINE ENGINE AND PULSE DETONATION COMBUSTION SYSTEM, which is incorporated herein by reference.

FIELD OF THE INVENTION

The present invention relates to gas turbine engines and pulse detonation combustion systems.

BACKGROUND

Combustion systems, such as for gas turbine engines and other machines, remain an area of interest. Some existing systems have various shortcomings, drawbacks, and disadvantages relative to certain applications. Accordingly, there remains a need for further contributions in this area of technology.

SUMMARY

One embodiment of the present invention is a unique pulse detonation combustion system. Another embodiment is a unique gas turbine engine. Other embodiments include unique apparatuses, systems, devices, hardware, methods, and combinations for pulse detonation combustion systems, gas turbine engines, and other machines and engines. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein:

FIGS. 3A-3G schematically illustrates some aspects of a non-limiting example of the operation of the pulse detonation combustion system of FIG. 2.

FIG. 3D1 schematically illustrates some aspects of a non-limiting example of a pulse detonation combustion system in accordance with an embodiment of the present invention.

DETAILED DESCRIPTION

Figure 1:
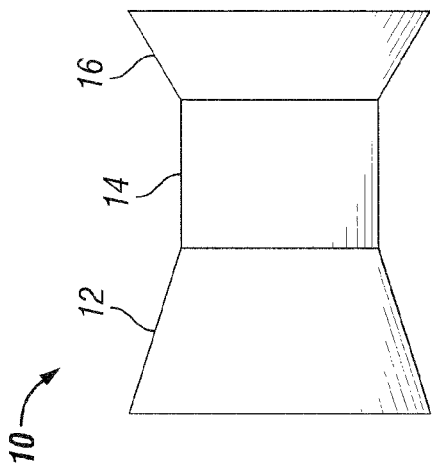
FIG. 1 schematically depicts some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, some aspects of a non-limiting example of a gas turbine engine 10 in accordance with an embodiment of the present invention are depicted. In one form, gas turbine engine 10 is an air vehicle propulsion power plant. In other embodiments, gas turbine engine 10 may be an aircraft auxiliary power unit, a land-based engine or a marine engine. In one form, gas turbine engine 10 is a single-spool turbojet engine. In other embodiments, gas turbine engine 10 may be a single or multi-spool turbofan, turboshaft, turbojet, turboprop gas turbine or combined cycle engine.

Gas turbine engine 10 includes a compressor system 12, a combustion system 14 and a turbine system 16. Combustion system 14 is fluidly disposed between compressor system 12 and turbine system 16. During the operation of gas turbine engine 10, air is drawn into the inlet of compressor system 12, pressurized, and discharged into combustion system 14. Fuel is mixed with the pressurized air in combustion system 14, which is then combusted. The combustion products are directed into turbine system 16, which extracts energy in the form of mechanical shaft power to drive compressor system 12. The hot gases exiting turbine system 16 are directed into a nozzle (not shown), and provide a thrust output of gas turbine engine 10.

Figure 2:
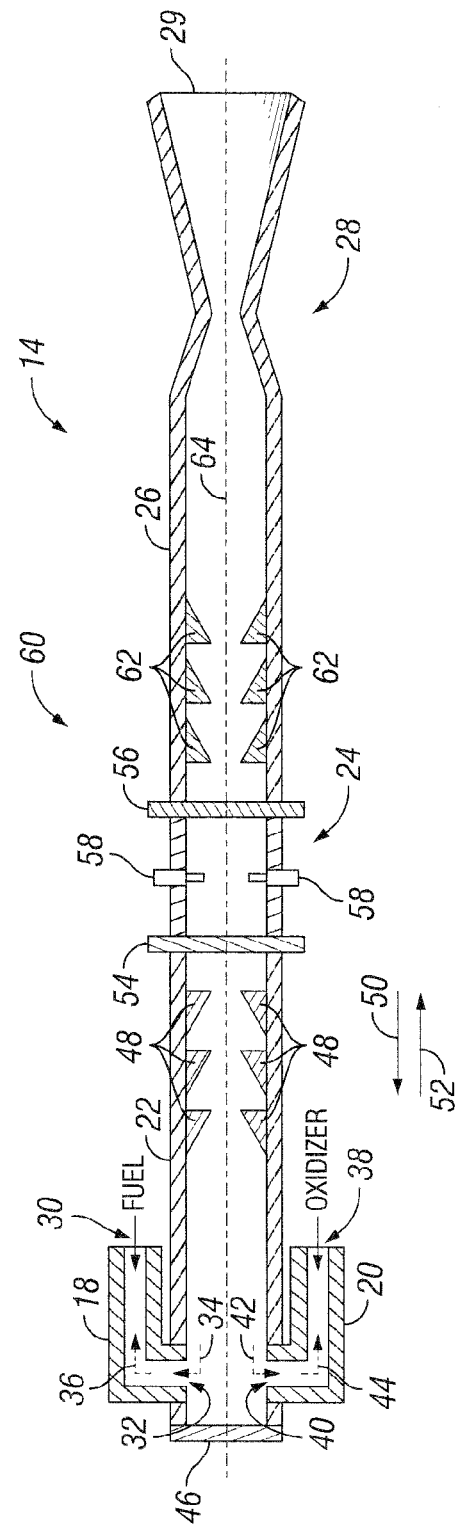
FIG. 2 schematically illustrates some aspects of a non-limiting example of a pulse detonation combustion system in accordance with an embodiment of the present invention.

Referring now to FIG. 2, a non-limiting example of some aspects of combustion system 14 are depicted. Combustion system 14 is a pulse detonation combustion system. In one form, pulse detonation combustion system 14 is a pressure gain combustion system that generates a higher post-combustion pressure relative to the pre-combustion pressure. In other embodiments, pulse detonation combustion system 14 may not be a pressure gain combustion system. In one form, the post-combustion thermodynamic properties of a pressure gain pulse detonation combustion system 14 are similar to constant volume combustion processes, which provide superior thermodynamic performance relative to constant pressure combustion processes typically employed, e.g., in gas turbine and rocket engines. Pulse detonation combustion system 14 combusts fuel and oxidizer (e.g., air) in a cyclic fashion to generate pulsed detonations that provide work, such as thrust and high pressure output. Fresh propellant (fuel and oxidizer) is provided in every cycle. The total amount of work generated by pulse detonation combustion system 14 is proportional to the cycle frequency, e.g., the number of pulse detonation waves per second. Hence, it is desirable that pulse detonation combustion system 14 generates each single pulse of detonation wave quickly.

In one form, combustion system 14 is a valveless pulse detonation combustion system. Although valves with high speed valve actuators to control fuel and oxidizer feed systems may be employed in pulse detonation combustion systems, these valve and control systems unnecessarily increase the cost and decrease the reliability of such systems relative to a valveless pulse detonation combustion system. A valveless pulse detonation combustion system is a pulse detonation combustion system that does not employ mechanical valves to control fuel and oxidizer feed timing. Rather a valveless pulse detonation combustion system employs a gasdynamic valving scheme, absent mechanical valves, that controls feed timing of the reactants (fuel and oxidizer). Although employed in the present example as a gas turbine engine combustor, in other embodiments combustion system 14 may be employed as a thrust producing engine in its own right. In still other embodiments, combustion system 14 may be employed for other purposes, e.g., in rocket systems, power generators, cleaning systems and/or manufacturing systems, e.g., as a detonation gun for a material deposition system.

In one form, pulse detonation combustion system 14 includes a fuel supply line 18, an oxidizer supply line 20, an inlet section 22, a vortex generator 24, a detonation chamber 26, a converging/diverging (CD) nozzle 28, and a discharge opening 29. In other embodiments, pulse detonation combustion system 14 may include a discharge opening without a nozzle or with another type of nozzle. In one form, pulse detonation combustion system 14 is an elongate tubular structure. In other embodiments, other suitable shapes may be employed. Pulse detonation combustion system 14 is operative to initiate deflagration combustion and to initiate a deflagration-to-detonation transition (DDT) for each detonation cycle. In one form, pulse detonation combustion system 14 is configured to control fuel and oxidizer supply timing without the use of a mechanical valve, i.e., without the use of one or more mechanical valves to control fuel and oxidizer supply timing. In other embodiments, pulse detonation combustion system 14 may be configured to control fuel and/or oxidizer flow/timing with the use of one or more mechanical valves. In one form, fuel and oxidizer and/or air are supplied separately through fuel and oxidizer supply lines 18 and 20 in order to eliminate or reduce potential flame propagation in the upstream direction into fuel and oxidizer supply lines 18 and 20.

In one form, inlet section 22, vortex generator 24, detonation chamber 26 and CD nozzle 28 are arranged fluidly in series such that a steady state flow though combustion system 14 results in the same flow direction, e.g., left-to-right in FIG. 2, through each of inlet section 22, vortex generator 24, detonation chamber 26 and CD nozzle 28. In other embodiments, inlet section 22, vortex generator 24, detonation chamber 26 and CD nozzle 28 may be arranged or oriented differently.

Fuel supply line 18 is in fluid communication with inlet section 22. Fuel supply line 18 is a multiple return bend supply line having an inlet 30 oriented in parallel to detonation chamber 26 and CD nozzle 28. In one form, fuel supply line 18 is operative to conserve the momentum of backflow for thrust. In one form, inlet 30 is oriented in the same direction as CD nozzle 28 and discharge 29 to aid in conserving backflow momentum. In other embodiments, inlet 30 may be oriented differently. Fuel is supplied to inlet section 22 via an injection port 32. From inlet section 22, fuel is communicated to vortex generator 24 and detonation chamber 26. In one form, fuel supply line 18 includes two (2) return bends, where fluid attempting to return into fuel supply line 18 must change directions twice, e.g., as indicated by bend arrows 34 and 36. In one form, the configuration of fuel supply line 18, including the number of return bends, is determined based on the supply pressures and mass flow rates of the oxidizer. In one form, the fuel supplied by fuel supply line 18 is supplied in gaseous form. In other embodiments, the fuel may be supplied in liquid form. In one form, the fuel is a hydrocarbon fuel. In other embodiments, other fuels may be employed, e.g., hydrogen.

Oxidizer supply line 20 is in fluid communication with inlet section 22. Oxidizer supply line 20 is a multiple return bend supply line having an inlet 38 oriented in parallel to detonation chamber 26 and CD nozzle 28. In one form, oxidizer supply line 20 is operative to conserve the momentum of backflow for thrust. In one form, inlet 38 is oriented in the same direction as CD nozzle 28 and discharge 29 to aid in conserving backflow momentum. In other embodiments, inlet 38 may be oriented differently. Oxidizer is supplied to inlet section 22 via an injection port 40, and from inlet section 22 is communicated to vortex generator 24 and detonation chamber 26. In one form, oxidizer supply line 20 includes two (2) return bends, where fluid attempting to return into fuel supply line 18 must change direction twice, e.g., as indicated by bend arrows 42 and 44. In one form, the configuration of oxidizer supply line 20, including the number of return bends, is determined based on the supply pressures and mass flow rates of the oxidizer. In one form, the oxidizer supplied by oxidizer supply line 20 is supplied in gaseous form. In other embodiments, the oxidizer may be supplied in liquid form. In one form, the oxidizer is air. In other embodiments, other oxidizers may be employed, e.g., pure or diluted oxygen. In one form, oxidizer is supplied via oxidizer supply line 20 as a purge gas to help purge combustion system 14 of combustion products after each detonation cycle. In other embodiments, a separate purge gas supply line may be employed. In still other embodiments, no purge gas may be employed.

Inlet section 22 includes a thrust wall 46. In one form, inlet section 22 also includes a flame accelerator 48. In other embodiments, inlet section 22 may not employ a flame accelerator. In one form, inlet section 22 functions as a buffer zone which impedes the backflow of gases upstream into return bend supply lines 18 and 20. The volume of inlet section 22 determines the impedance of inlet section 22 during the backflow process. The volume of inlet section 22 is tuned (designed, configured) to achieve a desired detonation cycle time based on the required cycle time of combustion system 14 for the particular application.

Thrust wall 46 is operative to reflect shock waves toward discharge opening 29. In one form, thrust wall 46 forms an end structure of inlet section 22 opposite discharge opening 29. Fuel supply line 18 and oxidizer supply line 20 are positioned to discharge fuel and oxidizer into pulse detonation combustion system 14 between thrust wall 46 and vortex generator 24. In one form, injection port 32 of fuel supply line 18 and injection port 40 of oxidizer supply line 20 are positioned between thrust wall 46 and flame accelerator 48. In one form, injection ports 32 and 40 are positioned to impinge the fuel against the oxidizer to enhance mixing of the fuel and oxidizer. In other embodiments, outlet 32 and outlet 40 may be positioned in other locations, e.g., other locations in inlet section 22.

Flame accelerator 48 is configured to generate internal drag forces in the flow of the fuel/oxidizer mixture and combustion products when combustion and precursor shock waves interact with flame accelerator 48 during the deflagration-to-detonation-transition. In one form, flame accelerator 48 is directionally dependent, i.e., is geometrically structured to yield a directionally-dependent drag coefficient, wherein the drag induced in flow through flame accelerator 48, e.g., of the oxidizer, the fuel/oxidizer mixture and/or the combustion products, depends on the direction of the flow. In other embodiments, flame accelerator 48 may not be directionally-dependent. In one form, flame accelerator 48 is structured to have a greater drag coefficient for precursor and combustion shockwave propagations in direction 50 than in direction 52. Flame accelerator 48 is configured to enhance the turbulent mixing of fuel and oxidizer in inlet section 22, and is configured to amplify precursor shock wave strength. In one form, the geometric shape of flame accelerator 48 is selected based on the bulk flow and wave propagation directions during the different phases of operation of combustion system 14. In other embodiments, the geometric shape of flame accelerator may also or alternatively be determined based on other parameters.

Vortex generator 24 includes an inlet face 54 and an outlet face 56. Vortex generator 24 is in fluid communication with inlet section 22. In one form, a plurality of igniters 58 are positioned between inlet face 54 and outlet face 56. In other embodiments, only a single igniter 58 may be employed. Each igniter 58 is operative to initiate deflagration combustion of fuel and oxidizer in vortex generator 24 received from fuel supply line 18 and oxidizer supply line 20. In one form, vortex generator 24 is structured to reduce the bulk flow speed of the fuel and oxidizer so that a deflagration flame may be more readily initiated using igniters 58. In one form, vortex generator is structured to generate a vortex recirculation zone to mix fuel and oxidizer to reduce DDT time and distance. In one form, inlet face 54 and outlet face 56 include a plurality of discrete openings, which provide flow areas for fuel, oxidizer and combustion products. In one form, the openings are discrete openings, e.g., shaped holes. In other embodiments, the flow areas may be in the form of porosity in inlet face 54 and outlet face 56, e.g., wherein inlet face 54 and outlet face 56 are formed of a porous material, such as a metal foam and/or a ceramic foam. In other embodiments, the flow areas may be provided by one or more discrete openings in one or both of inlet face 54 and outlet face 56 in addition to foam. In one form, outlet face 56 has a greater flow area than inlet face 54.

Multiple return bend fuel supply line 18 and oxidizer supply line 20, inlet section 22 and vortex generator 24 form a fluid diode 60. The function of the fluid diode is similar to the function of a semiconductor diode that acts as a one-way gate to electric current flow. The fluid diode offers a low resistance to inflow and a large resistance to backflow in order to emulate a nonreturn valve or check valve. Characteristics of fluid diode 60, such as operating supply pressures, effective valve opening/closing times and the flow resistance during the backflow process, are determined by the volume, geometry and flow characteristics of multiple bend fuel supply line 18 and oxidizer supply line 20, inlet section 22 and vortex generator 24.

Detonation chamber 26 includes a flame accelerator 62. Detonation chamber 26 is in fluid communication with vortex generator 24, and with inlet section 22 via vortex generator 24. Flame accelerator 62 is configured to generate internal drag forces in the flow of the fuel/oxidizer mixture and combustion products when combustion and precursor shock waves interact with flame accelerator 62 during the DDT process. In one form, flame accelerator 62 is directionally dependent, i.e., is geometrically structured to yield a directionally-dependent drag coefficient, wherein the drag induced in flow through flame accelerator 62, e.g., of the oxidizer, the fuel/oxidizer mixture and/or the combustion products, depends on the direction of the flow.

In one form, flame accelerator 62 is structured to have a greater drag coefficient for precursor and combustion shockwave propagations in direction 52 than in direction 50. Thus, in one form, the directionally-dependent drag coefficients of flame accelerators 48 and 62 yield increased drag in directions extending away from vortex generator 24. Flame accelerator 62 is configured to enhance the turbulent mixing of fuel and oxidizer in detonation chamber 26, and is configured to amplify precursor shock wave strength. In one form, the geometric shape of flame accelerator 62 is selected based on the bulk flow and wave propagation directions during the different phases of operation of combustion system 14.

In one form, flame accelerators 48 and 62 are configured such that the drag produced by flame accelerator 62 in detonation chamber 26 is counteracted by the drag produced by the flame accelerator 48 in inlet section 22 during the DDT process. In one form, inlet section 22, vortex generator 24 and detonation chamber 26 are operative to initiate DDT. In some embodiments, inlet section 22, vortex generator 24 and detonation chamber 26 are structured to initiate DDT using both flame accelerators 48 and 62. In other embodiments, i.e., embodiments that do not include flame accelerator 48, inlet section 22, vortex generator 24 and detonation chamber 26 are structured to initiate DDT with the aid of directional flame accelerator 62. In still other embodiments, i.e., embodiments that do not include flame accelerator 62, inlet section 22, vortex generator 24 and detonation chamber 26 are structured to initiate DDT with the aid of flame accelerator 48.

CD nozzle 28 is in fluid communication with detonation chamber 26. In one form, CD nozzle 28 is positioned at the end of the detonation chamber 26. In one form, CD nozzle 28 is operative to pressurize a fresh charge of propellants in the detonation chamber 26 in every cycle of operation, e.g., for each pulse detonation cycle. In one form, CD nozzle 28 is operative to convert propellant chemical energy to kinetic energy.

Discharge opening 29 is in fluid communication with detonation chamber 26. Discharge opening 29 is operative to discharge the combustion products from detonation chamber 26. In one form, discharge opening 29 is the discharge of CD nozzle 28. In embodiments that do not employ CD nozzle 28 or another nozzle, discharge opening 29 may be the outlet of detonation chamber 26.

Referring now to FIGS. 3A-3G, a non-limiting example of some aspects of the operation of combustion system 14 is described. During the operation of combustion system 14, fuel, such as a gaseous hydrocarbon fuel, is supplied via the multiple return bend fuel supply line 18; and oxidizer, such as oxygen or air, is supplied via multiple return bend supply line 20. In one form, gaseous fuel and oxidizer/air are employed to promote DDT process in terms of reduction of the DDT distance and/or the DDT time. In other embodiments, a liquid hydrocarbon fuel may be employed, e.g., directly or by preconditioning the fuel, such as by heating it to a flash point in order to reduce induction time. The fuel and the oxidizer are injected into inlet section 22 via injection ports 32 and 40, and flow into vortex generator 24 and detonation chamber 26. In one form, fuel injection 32 and oxidizer and air injection port 40 are oriented approximately perpendicular with the axis 64 of combustion system 14. In this way, the advantage of the return bend supply lines 18 and 20 is obtained by minimizing pressure loss during the backflow phase, e.g., as set forth herein.

Referring now to FIG. 3A, fuel 66 and oxidizer 68 are injected into inlet section 22. Fuel 66 and oxidizer 68 flow past flame accelerator 48, into vortex generator 24 and detonation chamber 26 under the action of the fuel and oxidizer supply pressures via the multiple return bend supply lines 18 and 20, respectively. Mixing takes place in inlet section 22, e.g., due to the action of the flow streams impinging upon each other, yielding a combined propellant stream 70. Further mixing of the combined propellant flow 70 takes place in flame accelerator 48 (for those embodiments so equipped), resulting from the drag induced into the flowstream by flame accelerator 48. The propellant flow expands as it flows toward discharge opening 29. CD nozzle 28 is dimensioned to achieve a desired mass flow rate that is exhausted in each cycle to maintain a desired fill pressure inside combustion system 14. The total amount of mass charged at each cycle is proportional to thrust production per cycle, and hence it is desirable to keep a high fill pressure inside combustion system 14. In one form, the fill described here is the pressure inside of detonation chamber 26. The higher this pressure, the more mass (fresh fuel and oxidizer) that is stored in the chamber leading to more work extraction. Acceptable fill pressure is dependent upon various factors, including, for example, the thermal efficiency of the cycle being produced, e.g., with a pulse detonation combustor-based gas turbine system. In some embodiments, it is desirable to maintain higher fill pressure to load mass into the chamber as much as possible/practical.

Referring now to FIG. 3B-3D, igniters 58 provide electrical discharge sparks, which ignite deflagration combustion waves 72 and 74. Combustion waves 72 and 74 propagate toward CD nozzle 28 and thrust wall 46, respectively. The combustion waves 72 and 74 interact with flame accelerators 62 and 48, respectively, which enhances the turbulent mixing process of fuel and oxidizer. The turbulent mixing process enhances the DDT process by increasing the volumetric heat release rate of the mixture as the reaction accelerates the bulk flow of the mixture. The reaction waves or flames 72, 74 generate precursor shock waves 76, 78, which are strengthened through interactions with the flame accelerators 48, 62, respectively. The precursor shock waves 76, 78 elevate post-shock temperature due to its non-isentropic nature, resulting in a positive feedback mechanism between the reaction waves 72, 74 and the precursor shock waves 76, 78 to promote further acceleration of the bulk flow, which results in the generation of detonation (shock) waves 80, 82. The flame acceleration process in a deflagration-to-detonation-transition (DDT) creates internal drag forces during the interactions with flame accelerators, which may result in some thrust production loss in some propulsion applications of a pulse detonation combustion system. However, the configuration of combustion system 14 compensates for some of the internal drag loss by cancellation of two counter-propagating waves 72 and 74, and 76 and 78, respectively.

It will be noted that in various embodiments, the flame accelerator (48, 62 or both) with the same features may also be incorporated into a valved pulse detonation combustor (i.e., a pulse detonation combustor with mechanically actuated valves to control feed timing) or a CVC (Constant Volume Combustor) incorporated into a dynamic pressure exchanger/wave rotor in order to recover drag losses with the flow-direction-dependent drag coefficient feature. Such an example is described in FIG. 3D1 (below) where two valves (X1 and X2) are equipped at both inflow (X1) and outflow (X2) ends of the combustor with the flame accelerator (X3) and the ignition system (X4). As presented in FIG. 3D1, the configuration of the ignition system may change associated with the design of the flame accelerator for the unsteady pressure gain combustors (e.g., pulse detonation combustors).

Figure 3G:
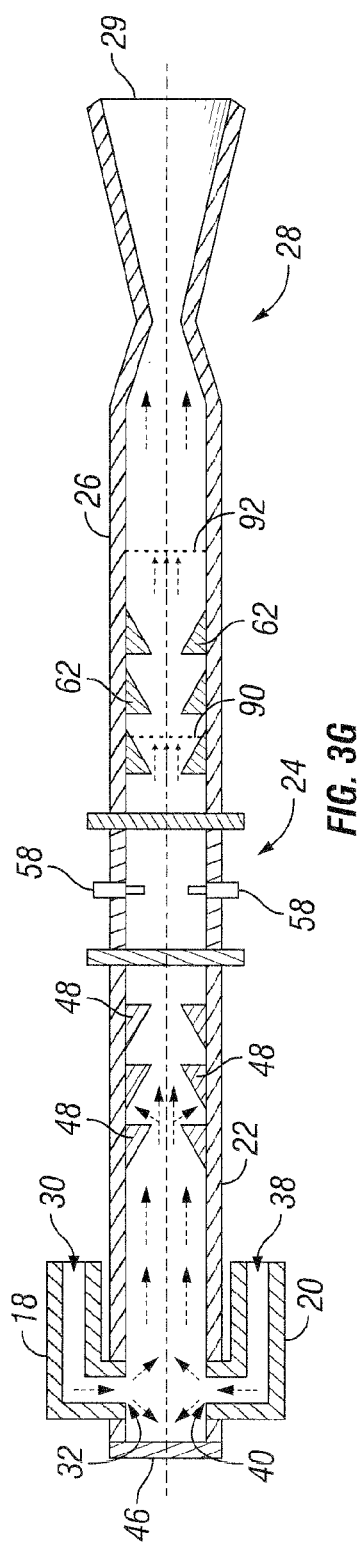

Referring now to FIGS. 3E-3G, detonation wave 82 reflects off thrust wall 46, yielding a reflected shock wave 84. A post-detonation or post-shock pressure is increased such that the inlets (injection ports 32, 40) of the gasdynamic valves are pressurized to be closed, as shown in FIG. 3E. Mass fluxes of fuel and oxidizer are decelerated or impeded because of the reduced pressure gradient across the return bend supply lines 18 and 20. Fuel and oxidizer are supplied from the separated supply lines 18 and 20, and thus flames do not propagate upstream into multiple return bend supply lines 18 and 20 due to their flammability limits (e.g., the combustibility of the mixture is exhausted). In the mean time, detonation wave 80 propagates toward the open end CD nozzle 28. Reactions behind the detonation wave 80 are completed, and the reflected shock wave 84 continues to attenuate, contributing to a reduction of internal drag production caused by interactions between reflected shock wave 84 and flame accelerator 62. In one form, flame accelerator 48 is configured to reduce the drag coefficient produced by interactions with the reflected shock wave 84 by virtue of its directionally dependent drag coefficient. After the detonation wave 80 propagates out of discharge opening 29, the pressure inside of combustion system 14 decreases due to expansion waves initiating a blowdown process 86 resulting from a pressure gradient across combustion system 14. Once the inside of the combustion system 14 is depressurized enough to create a negative pressure gradient across multiple return bend oxidizer supply line 20, oxidizer injection port 40, functioning as a component of a gas dynamic valve, opens to supply oxidizer into inlet section 22, creating a buffer zone between hot combustion products on the right side of an oxidizer/combustion product interface 88 and a fresh propellant charge (fuel and oxidizer), in order to prevent auto-ignition of the fuel and oxidizer intended for the next detonation cycle. In one form, the supply pressure for the oxidizer is higher than that for the fuel, and hence the oxidizer gasdynamic valve opens before the fuel gasdynamic valve opens. It will be understood that the term, "gasdynamic valve" describes that the injection ports 32 and 40 are effectively opened or closed based on gas dynamics, and does not refer to the use of a mechanical valve. After the pressure at the inlet of the multiple return bend fuel supply line 18 is lower than the fuel supply pressure, the fuel gasdynamic valve (injection port 32) opens, which results in fuel mixing with oxidizer, flowing into the inlet section 22, the vortex generator 24 and the detonation chamber 26. FIG. 3G depicts contact surfaces 90 and 92, which represent boundaries or interfaces between different types of mass flow inside combustion system 14. A contact surface is a boundary between two different gases in terms of temperature and density, but the same in pressure and velocity. The incoming propellant (fuel and oxidizer) is located behind (to the left of) the contact surface 90, oxidizer is located between contact surfaces 90 and 92, and the hot combustion products of the previous detonation cycle are located to the right side of the contact surface 92.

Figure 4:
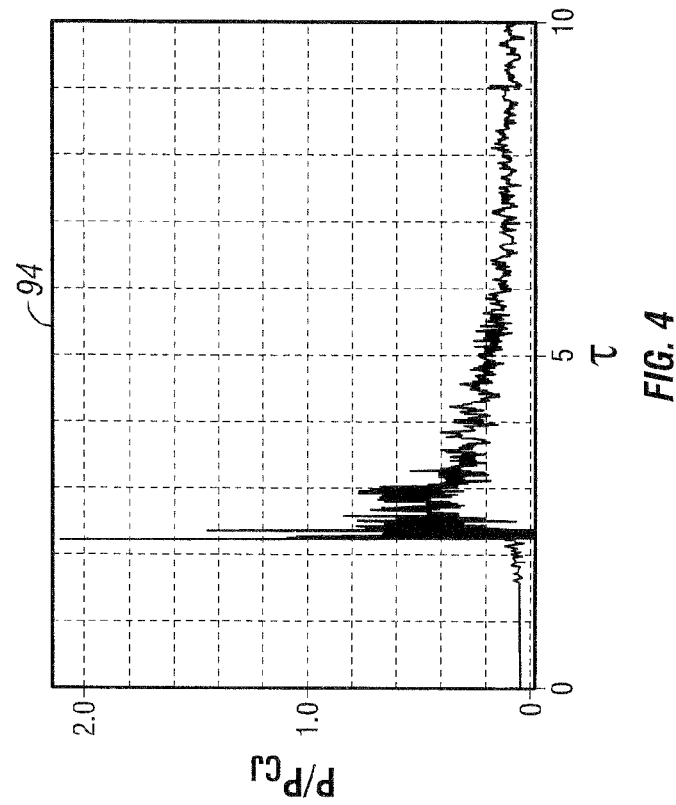
FIG. 4 is a non-limiting example of a plot of pressure vs. time, measured at a detonation chamber, depicting a deflagration-to-detonation transition process.

Referring to FIG. 4, a non-limiting example of a plot 94 of pressure vs. time, measured in detonation chamber 26 after the DDT process, is depicted. The pressure history is normalized by the theoretical Chapman-Jouguet detonation pressure $P_{CJ}$ at an initial condition. In the example of FIG. 4, the initial condition was close to ambient condition (approximately 14.7 psia and approximately 540° R). In other embodiments, other initial conditions may be employed, e.g., depending upon the needs of the particular application. The time scale is normalized by $\tau=tc/L$ where t, c and L represent time, the speed of sound at the pressure conditions in combustion system 14 and the length of the detonation chamber 26, respectively. A typical pressure spike from the detonation wave is observed at $\tau=2.2$, followed by approximately unity pressure and a decrease of pressure during the blowdown process. The combustion products are exhausted out of detonation chamber 26, vortex generator 24 and inlet section 22 during the blowdown process, due to the pressure gradient across the combustion system 14. Once the pressure inside of the combustion system 14 sufficiently decreases during the blowdown process, mass fluxes of fuel and oxidizer start to flow to inlet section 22 due to pressure gradient between the supply pressures of fuel and oxidizer, and the pressure inside inlet section 22. Characteristics of the gasdynamic valves, such as mass flow rate, and the valve effective opening/closing time are dependent on configuration of the combustion system 14;

e.g., including length and volume of combustion system 14, and the number of the return bends in supply lines 18 and 20.

Embodiments of the present invention include a pulse detonation combustion system, comprising: an inlet section having a first flame accelerator; a fuel supply line in fluid communication with the inlet section; an oxidizer supply line in fluid communication with the inlet section; a vortex generator having an inlet face and an outlet face, wherein the vortex generator is in fluid communication with the inlet section; an igniter coupled to the vortex generator and positioned between the inlet face and the outlet face of the vortex generator, wherein the igniter is operative to initiate deflagration combustion of fuel and oxidizer received from the fuel supply line and the oxidizer supply line; a detonation chamber having a second flame accelerator, wherein the detonation chamber is in fluid communication with the inlet section via the vortex generator; and a discharge opening in fluid communication with the detonation chamber and operative to discharge combustion products, wherein the inlet section, the first flame accelerator, the vortex generator and the second flame accelerator are operative to initiate a deflagration to detonation transition.

In a refinement, the inlet face of the vortex generator has a first flow area; wherein the outlet face of the vortex generator has a second flow area; and wherein the second flow area is greater than the first flow area.

In another refinement, the vortex generator is structured to reduce the bulk flow speed of the fuel and oxidizer.

In yet another refinement, at least one of the first flame accelerator and the second flame accelerator are structured to have a directionally-dependent drag coefficient.

In still another refinement, both the first flame accelerator and the second flame accelerator are structured to have directionally-dependent drag coefficients.

In yet still another refinement, the directionally-dependent drag coefficients have increased drag in directions extending away from the vortex generator.

In a further refinement, the pulse detonation combustion further comprises a converging-diverging nozzle in fluid communication with the detonation chamber.

In a yet further refinement, the pulse detonation combustion system is configured to control fuel and oxidizer supply timing without the use of a mechanical valve.

Embodiments of the present invention include a pulse detonation combustion system, comprising: a fuel supply line; an oxidizer supply line separate from the fuel supply line; an inlet section in communication with the fuel supply line and the oxidizer supply line; a vortex generator having an inlet face and an outlet face, wherein the vortex generator is in fluid communication with the inlet section; an igniter coupled to the vortex generator and positioned between the inlet face and the outlet face of the vortex generator, wherein the igniter is operative to initiate deflagration combustion of fuel and oxidizer received from the fuel supply line and the oxidizer supply line; a detonation chamber in fluid communication with inlet section via the vortex generator; a flame accelerator having a directionally dependent drag coefficient; and a discharge opening in fluid communication with the detonation chamber and operative to discharge combustion products, wherein the inlet section, the vortex generator and the flame accelerator are operative to initiate a deflagration to detonation transition.

In a refinement, the fuel supply line and the oxidizer supply line are multiple return bend supply lines.

In another refinement, the fuel supply line and the oxidizer supply line have inlets oriented in parallel to the detonation chamber.

In yet another refinement, the pulse detonation combustion system further comprises a thrust wall that is operative to reflect a shock wave toward the discharge opening.

In still another refinement, the fuel supply line and the oxidizer supply line are positioned to discharge the fuel and the oxidizer into the pulse detonation combustion system between the thrust wall and the vortex generator.

In yet still another refinement, the thrust wall forms an end structure of the inlet section.

In a further refinement, the pulse detonation combustion system is configured to control fuel and oxidizer supply timing without the use of a mechanical valve.

Embodiments of the present invention include a gas turbine engine, comprising: a compressor; a turbine; and a pulse detonation combustion system fluidly disposed between the compressor and the turbine, including: a fuel supply line; an oxidizer supply line separate from the fuel supply line; an inlet section in communication with the fuel supply line and the oxidizer supply line; a vortex generator having an inlet face and an outlet face, wherein the vortex generator is in fluid communication with the inlet section; an igniter coupled to the vortex generator and positioned between the inlet face and the outlet face of the vortex generator, wherein the igniter is operative to initiate deflagration combustion of fuel and oxidizer received from the fuel supply line and the oxidizer supply line; a detonation chamber in fluid communication with inlet section via the vortex generator; a flame accelerator having a directionally dependent drag coefficient; and a discharge opening in fluid communication with the detonation chamber and operative to discharge combustion products, wherein the inlet section, the vortex generator and the flame accelerator are operative to initiate a deflagration to detonation transition.

In a refinement, a volume of the inlet section is tuned to achieve a desired detonation cycle time.

In another refinement, the gas turbine engine further comprises a converging-diverging nozzle in fluid communication with the detonation chamber.

In yet another refinement, the flame accelerator is structured to amplify a precursor shock wave strength.

In still another refinement, the flame accelerator is structured to perform turbulent mixing of the fuel and the oxidizer.

In yet still another refinement, the pulse detonation combustion system is configured to control fuel and oxidizer supply timing without the use of a mechanical valve.

In a further refinement, the vortex generator includes a recirculation zone for mixing fuel and oxidizer.

In a yet further refinement, the flame accelerator is positioned in the detonation chamber.

In a still further refinement, the flame accelerator is positioned in the inlet section.

In a yet still further refinement, the gas turbine engine further comprises an other flame accelerator positioned in the detonation chamber.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A pulse detonation combustion system, comprising:
   an inlet section in communication with a fuel supply and an oxidizer supply;
   a detonation chamber in fluid communication with the inlet section;
   an igniter in fluid communication with the inlet section and the detonation chamber; and
   a plurality of first flame accelerators disposed on an upstream side of the igniter and a plurality of second flame accelerators disposed on a downstream side of the igniter,
   wherein at least one first flame accelerator of the plurality of first flame accelerators and at least one second flame accelerator of the plurality of second flame accelerators are geometrically structured to have directionally-dependent drag coefficients, wherein the at least one first flame accelerator and the at least one second flame accelerator have a greater drag coefficient for precursor and combustion shockwaves propagating in a direction away from the igniter than for waves propagating in a direction toward the igniter.

2. The pulse detonation combustion system of claim 1, wherein drag forces produced by the at least one first flame accelerator during the deflagration to detonation transition are counteracted by drag forces produced by the at least one second flame accelerator during the deflagration to detonation transition.

3. The pulse detonation combustion system of claim 1, wherein the at least one first flame accelerator and the at least one second flame accelerator have a more abrupt transition for waves propagating in a direction away from the igniter than for waves propagating in a direction toward the igniter.

4. The pulse detonation combustion system of claim 1, wherein the at least one first flame accelerator and the at least one second flame accelerator are geometrically configured to generate drag forces of the same magnitude but opposite in direction relative to each other for counter-propagating waves propagating in a direction away from the igniter.

5. A pulse detonation combustion system, comprising:
   an inlet section having a first flame accelerator;
   a fuel supply line in fluid communication with the inlet section;
   an oxidizer supply line in fluid communication with the inlet section;
   a vortex generator having an inlet face and an outlet face, wherein the vortex generator is in fluid communication with the inlet section;
   an igniter coupled to the vortex generator and positioned between the inlet face and the outlet face of the vortex generator, wherein the igniter is operative to initiate deflagration combustion of fuel and oxidizer received from the fuel supply line and the oxidizer supply line;
   a detonation chamber having a second flame accelerator, wherein the detonation chamber is in fluid communication with the inlet section via the vortex generator, wherein the first flame accelerator is disposed on an upstream side of the igniter and the second flame accelerator is disposed on a downstream side of the igniter; and
   a discharge opening in fluid communication with the detonation chamber and operative to discharge combustion products,
   wherein the inlet section, the first flame accelerator, the vortex generator and the second flame accelerator are operative to initiate a deflagration to detonation transition,
   wherein the first flame accelerator and the second flame accelerator are geometrically structured to have a directionally-dependent drag coefficient, each having a greater drag coefficient for precursor and combustion shockwave propagations in a direction away from the igniter than for wave propagations propagating in a direction toward the igniter.

6. The pulse detonation combustion system of claim 5, wherein the drag forces produced by the first flame accelerator during the deflagration to detonation transition are counteracted by the drag forces produced by the second flame accelerator during the deflagration to detonation transition.

7. The pulse detonation combustion system of claim 5, wherein the first flame accelerator and the second flame accelerator each have a more abrupt transition for waves propagating in a direction away from the igniter than for waves propagating in a direction toward the igniter.

8. The pulse detonation combustion system of claim 5, wherein the first flame accelerator and the second flame accelerator are geometrically configured to respectively generate drag forces of the same magnitude but opposite in direction for counter-propagating waves propagating in a direction away from the igniter.

9. The pulse detonation combustion system of claim 5, further comprising a converging-diverging nozzle in fluid communication with the detonation chamber.

10. A gas turbine engine, comprising:
    a compressor;
    a turbine; and
    a pulse detonation combustion system fluidly disposed between the compressor and the turbine, including:
    a fuel supply line;
    an oxidizer supply line separate from the fuel supply line;
    an inlet section in communication with the fuel supply line and the oxidizer supply line;
    a vortex generator having an inlet face and an outlet face, wherein the vortex generator is in fluid communication with the inlet section;
    an igniter coupled to the vortex generator and positioned between the inlet face and the outlet face of the vortex generator, wherein the igniter is operative to initiate deflagration combustion of fuel and oxidizer received from the fuel supply line and the oxidizer supply line;
    a detonation chamber in fluid communication with the inlet section via the vortex generator;
    a first flame accelerator disposed on an upstream side of the igniter and a second flame accelerator disposed on a downstream side of the igniter; and
    a discharge opening in fluid communication with the detonation chamber and operative to discharge combustion products,
    wherein the inlet section, the vortex generator and the flame accelerator are operative to initiate a deflagration to detonation transition; and
    wherein the first flame accelerator and the second flame accelerator are geometrically structured to have a directionally-dependent drag coefficient, each having a greater drag coefficient for precursor and combustion shockwaves propagating in a direction away from the igniter than for waves propagating in a direction toward the igniter.

11. The gas turbine engine of claim 10, wherein a volume of the inlet section is tuned to achieve a desired detonation cycle time.

12. The gas turbine engine of claim 10, further comprising a converging-diverging nozzle in fluid communication with the detonation chamber.

13. The gas turbine engine of claim 10, wherein the flame accelerator is structured to amplify a precursor shock wave strength.

14. The gas turbine engine of claim 10, wherein the flame accelerator is structured to perform turbulent mixing of the fuel and the oxidizer.

15. The gas turbine engine of claim 10, wherein the pulse detonation combustion system is configured to control fuel and oxidizer supply timing without the use of a mechanical valve.

16. The gas turbine engine of claim 10, wherein the vortex generator includes a recirculation zone for mixing fuel and oxidizer.

17. The gas turbine engine of claim 10, wherein the flame accelerator is positioned in the detonation chamber.

18. The gas turbine engine of claim 10, wherein the flame accelerator is positioned in the inlet section.

19. The gas turbine engine of claim 10, further comprising an other flame accelerator positioned in the detonation chamber.

20. The pulse detonation combustion system of claim 10, wherein each of the first flame accelerator and the second flame accelerator have a more abrupt transition for waves propagating in a direction away from the igniter than for waves propagating in a direction toward the igniter.

* * * * *